(No Model.)
J. GERSTNER.
HARROW.
No. 280,602. Patented July 3, 1883.
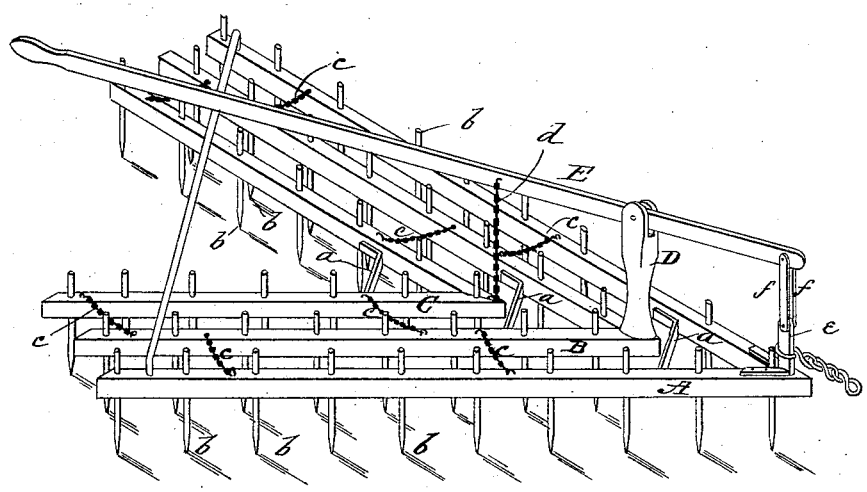
Witnesses:
G. Smith
John M. Patterson
Jacob Gerstner,
by Connolly Bros & McTighe
Attorneys

UNITED STATES PATENT OFFICE.

JACOB GERSTNER, OF BUTLER, PENNSYLVANIA.

HARROW.

SPECIFICATION forming part of Letters Patent No. 280,602, dated July 3, 1883.

Application filed January 29, 1883. (No model.)

*To all whom it may concern:*

Be it known that I, JACOB GERSTNER, of Butler, in the county of Butler and State of Pennsylvania, have invented certain new and useful Improvements in Harrows; and I do hereby declare that the following is a full, clear, and exact description of the invention, which will enable others skilled in the art to which it appertains to make and use the same, reference being had to the accompanying drawing, which forms a part of this specification, in which is shown a perspective view of the completed article.

My invention relates to harrows of that class in which several sections are secured together by chains or equivalent flexible connections; and it has for its object the provision of means whereby the several sections may be separately elevated to clear their teeth of earth, weeds, or other rubbish, and to enable the harrow to rise over inequalities or obstructions in the field.

My invention consists in a harrow composed of two or more V-shaped sections, connected together by means of chains or other similar flexible connections, and provided with a lever fulcrumed on an upright standard on one of said sections and attached to the other section or sections by suitable flexible or pivoted connections, whereby the alternate elevation and depression of the lever will serve to successively raise and lower the forward ends of said sections for the purpose of clearing the teeth of the harrow or of permitting it to rise upon and ride over any obstruction upon or inequality of the surface of the soil, the sections when so raised resting on the last tooth on each side of their rear ends.

Referring to the perspective view in the accompanying drawing, A B C represent the several sections composing the harrow. Each of these sections consists of two beams or bars, connected together at one end and provided with suitable cross-braces, $a\ a\ a$, and teeth $b\ b$. The frames A B C fit within one another and are connected together by chains $c\ c\ c$, secured to the bars at their forward and rear ends.

D represents an upright standard at the forward end of frame B, and E a lever pivoted to the said standard and extending backward to the rear of frame C, where it is provided with a suitable handle. The frame C is connected to the lever E by a chain, $d$, at its forward end, and the section A is connected to the end of said lever by an upright, $e$, at its forward end, and straps $f\,f$, pivoted to said upright and the lever E, the straps $f\,f$ thus forming a link-connection between said upright and lever.

The operation of my invention is as follows: If the teeth of the harrow become clogged, the separate sections may be successively elevated through the medium of the lever E and the dirt or rubbish allowed to drop down from between said teeth—as, for instance, if the teeth of the section A become clogged, the lever E is depressed, the forward end of section A is elevated, and the earth or rubbish is allowed to drop out. When it is desired to raise section B, the lever is elevated, in this case the link-straps $f\,f$ and upright $e$ serving as a fulcrum for the lever, and the section B raised a sufficient distance to allow the teeth to clear the surface of the soil. A still further elevation of the lever serves to elevate the forward end of section C in a like manner, the chain $d$ being of a length sufficient to allow the section B to be raised at its forward end before becoming taut. When any inequality of the soil or obstruction in the path of the harrow is met with, the sections A B C are successively operated, as above described, and the harrow will rise upon and ride over such inequality or obstruction, and avoid the injurious strain consequent upon a sudden stoppage. In harrowing a hill-side the inner sections have a tendency to slide down toward the lower side of the outer section and work the ground unevenly. This I avoid by shortening up the chains on the upper or higher side of the sections, so as to keep the inner sections always in their proper positions with relation to the outer section.

I have shown and described a harrow composed of three sections; but one of said sections may be dispensed with without affecting the successful operation of the invention.

I am aware that a sectional harrow connected together by chains is not new, and I do not claim such, broadly.

I am also aware that it is not new, broadly, to construct a harrow in two sections, with a lever pivoted on one section and attached to the other, whereby the second section may be elevated by means of said lever.

I claim—

The combination of section B, standard D, and pivoted lever E with section C, connected to said lever by chain $d$, and section A, connected to the lever by upright $e$ and straps $f f$, substantially as described and shown.

In testimony that I claim the foregoing as my own I have hereto affixed my signature in presence of two witnesses.

JACOB GERSTNER.

Witnesses:
EDWARD M. BREDIN,
DOMINICK IHMSEN.